(12) United States Patent
Eccleston et al.

(10) Patent No.: US 8,104,797 B2
(45) Date of Patent: Jan. 31, 2012

(54) EXTENDED COLLAR

(75) Inventors: Tony Eccleston, High Heaton (GB); George Karabelas, Houghton Le-Spring (GB); Zhimin Tan, Katy, TX (US)

(73) Assignee: Wellstream International Limited, Newcastle-Upon-Tyne (GB)

( * ) Notice: Subject to any disclaimer, the term of this patent is extended or adjusted under 35 U.S.C. 154(b) by 142 days.

(21) Appl. No.: 12/304,265

(22) PCT Filed: Apr. 23, 2007

(86) PCT No.: PCT/GB2007/001469
§ 371 (c)(1),
(2), (4) Date: Dec. 10, 2008

(87) PCT Pub. No.: WO2007/144551
PCT Pub. Date: Dec. 21, 2007

(65) Prior Publication Data
US 2009/0250925 A1    Oct. 8, 2009

(30) Foreign Application Priority Data

Jun. 16, 2006  (GB) .................................. 0611967.1

(51) Int. Cl.
*F16L 31/00* (2006.01)
(52) U.S. Cl. .................................. 285/222.4; 285/222.1
(58) Field of Classification Search ..... 285/222.1–222.5
See application file for complete search history.

(56) References Cited

U.S. PATENT DOCUMENTS

| | | | |
|---|---|---|---|
| 2,940,778 A | 6/1960 | Kaiser | |
| 5,685,576 A | 11/1997 | Wolfe et al. | |
| 5,860,682 A | 1/1999 | Belcher | |
| 6,283,206 B1 * | 9/2001 | Fraser et al. | 166/242.3 |
| 6,592,153 B1 * | 7/2003 | Belcher | 285/222.2 |
| 2004/0066035 A1 | 4/2004 | Buon et al. | |

FOREIGN PATENT DOCUMENTS

| | | |
|---|---|---|
| GB | 747116 A | 3/1956 |
| GB | 805911 A | 12/1958 |
| GB | 905911 A | 9/1962 |
| GB | 954051 A | 4/1964 |

(Continued)

OTHER PUBLICATIONS

United Kingdom Intellectual Property Office—Search Report for corresponding Great Britain Patent Application No. GB0611967.1, dated Sep. 10, 2007, 2 pages.

(Continued)

*Primary Examiner* — Aaron Dunwoody
(74) *Attorney, Agent, or Firm* — Klarquist Sparkman, LLP

(57) ABSTRACT

A method and apparatus are disclosed for providing an end fitting for a flexible pipe. The apparatus comprises an end fitting body having an open mouth for receiving an open end of a portion of flexible pipe body and an inner collar member to which the end fitting body is securable. The inner collar member includes a collar body portion and a neck portion extending away from the collar body portion. When the end fitting body is secured to the collar member the neck portion of the collar member extends in an axial direction away from the end fitting body to a region proximate to where at least one armour wire layer of the flexible pipe body is located.

14 Claims, 9 Drawing Sheets

FOREIGN PATENT DOCUMENTS

| | | |
|---|---|---|
| WO | WO94/13993 A1 | 6/1994 |
| WO | WO03/004921 A1 | 1/2003 |
| WO | WO2004/076907 A1 | 9/2004 |

OTHER PUBLICATIONS

International Search Report of the International Searching Authority for corresponding International Application No. PCT/GB2007/001469, mailed Sep. 19, 2007, 3 pages.

International Preliminary Report on Patentability and Written Opinion of the International Searching Authority for corresponding International Application No. PCT/GB2007/001469, mailed Dec. 31, 2008, 8 pages.

United Kingdom Intellectual Property Office—Examination Report for corresponding Great Britain Patent Application No. GB0611967.1, dated Sep. 30, 2010, 2 pages.

* cited by examiner

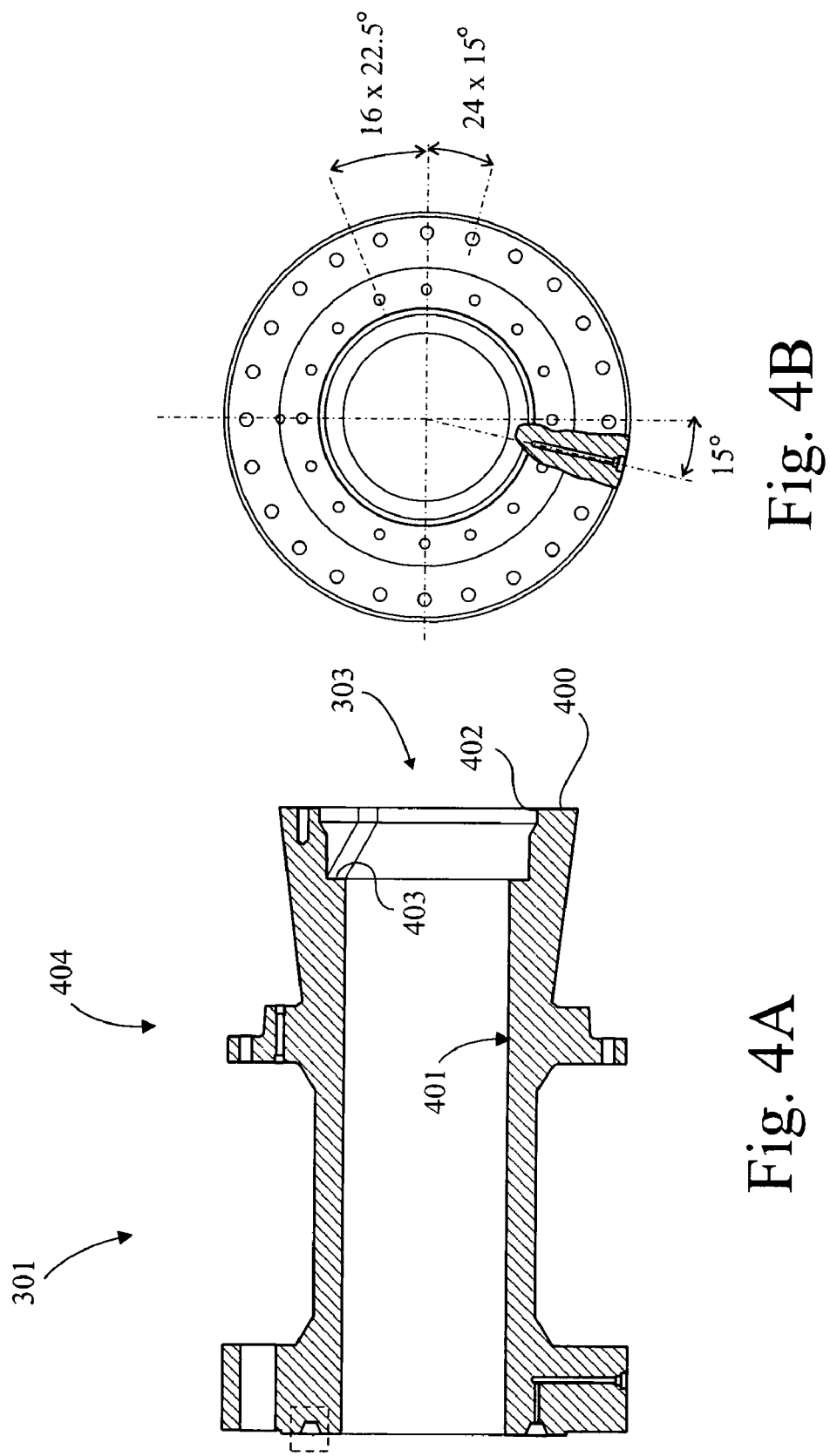

EXTENDED COLLAR

CROSS REFERENCE TO RELATED APPLICATIONS

This is the U.S. National Stage of International Application No. PCT/GB2007/001469, filed Apr. 23, 2007, which in turn claims the benefit of Great Britain Application No. 0611967.1, filed Jun. 16, 2006.

FIELD

The present invention relates to an apparatus and method for providing an end fitting for a flexible pipe. In particular, but not exclusively, the present invention relates to an inner collar having a neck which, in use, extends axially within an end fitting in which an open end of a portion of flexible pipe body is terminated. The neck portion of the inner collar supports a barrier layer or some other underlying layer of the flexible pipe body so as to prevent burst through of the barrier layer material or material forming the one or more underlying layer.

BACKGROUND

Traditionally flexible pipe is utilised to transport production fluids, such as oil and/or gas and/or water, from one location to another. Flexible pipe is particularly useful in connecting a sub-sea location to a sea level location. Flexible pipe is generally formed as an assembly of a portion of flexible pipe body and one or more end fittings. The pipe body is typically formed as a composite of layered materials that form a pressure-containing conduit. The pipe structure allows large deflections without causing bending stresses that impair the pipe's functionality over its lifetime. The pipe body is generally built up as a composite structure including metallic and polymer layers.

The end fittings of a flexible pipe may be used for connecting segments of flexible pipe together or for connecting them to terminal equipment such as a rigid sub-sea structures or floating facilities. As such amongst other varied uses, flexible pipe can be used to provide a riser assembly for transporting fluids from a sub-sea flow line to a floating structure. In such a riser assembly a first segment of flexible pipe may be connected to one or more further segments of flexible pipe. Each segment of flexible pipe includes at least one end fitting.

It is well-known that there are many varied problems associated with the provision of end fittings for ends of flexible pipe body. The end fittings must ensure both good fastening and good sealing. Particular problems occur when the various specific layers of the multi layer flexible pipe body are terminated. The flexible pipe body may include layers having very different material characteristics such as single polymer layers and/or interlocked metallic layers. The termination of each of these layers in an end fitting brings with it characteristic problems. For example, flexible pipe body typically includes a barrier layer formed generally as a polymer sheath or pressure sheath. Such a layer operates as a primary liquid retaining layer. To prevent rupture of such a layer or indeed any underlying layer under high pressure caused by the pressure of the transported fluid, an interlocked wire layer is often located outside the barrier layer. Armour layers formed by layers of wire may also be provided to sustain tensile loads and internal pressure. If a pressure armour layer is not supported along its length, it is possible for portions of the barrier layer or other such underlying layer to burst through under pressure and cause failure of the terminating structure.

SUMMARY

It is an aim of the present invention to at least partly mitigate the above-mentioned problems.

It is an aim of embodiments of the present invention to provide an apparatus and method for providing an end fitting for a flexible pipe.

It is an aim of embodiments of the present invention to provide an end fitting for a flexible pipe in which an inner collar member extends substantially parallel with a barrier layer of flexible pipe body so as to support the barrier layer between an end fitting body and a region proximate to where armour wire layers of the flexible pipe body are bent away from a supporting role for the pipe body. Such a region occurs because the armour layers are to be terminated in the end fitting.

According to a first aspect of the present invention there is provided an apparatus for providing an end fitting for a flexible pipe, comprising:
  an end fitting body having an open mouth region for receiving an open end of a portion of flexible pipe body; and
  an inner collar member to which said end fitting body is securable, said collar member comprising a collar body portion and a neck portion extending away from said collar body portion; wherein
  when said end fitting body is secured to said collar member, the neck portion of the collar member extends in an axial direction away from the end fitting body to a region proximate to where at least one armour wire layer of the flexible pipe body is located.

According to a second aspect of the present invention there is provided a method for providing an end fitting at an end of a portion of flexible pipe body, comprising the steps of:
  providing an inner collar member comprising a collar body portion and a neck portion extending away from the collar body portion; and
  securing the end fitting body to the collar member whereby the neck portion of the collar member extends in an axial direction away from the end fitting body to a region proximate to where at least one armour wire layer of the flexible pipe body is located.

Embodiments of the present invention provide an inner collar member to which an end fitting can be secured and which includes a neck portion which extends in an axial direction away from an end fitting body to a region where armour wire layers of the flexible pipe body are located. Advantageously an inner surface of the inner collar member is arranged to support the barrier layer along its whole length between an end fitting body and a region of the flexible pipe body where armour layers are bent away from the barrier layer so as to be terminated in the end fitting.

BRIEF DESCRIPTION OF THE DRAWINGS

Embodiments of the present invention will now be described hereinafter, by way of example only, with reference to the accompanying drawings in which:
FIG. 4 illustrates an end fitting body.

DETAILED DESCRIPTION

Figure 1:
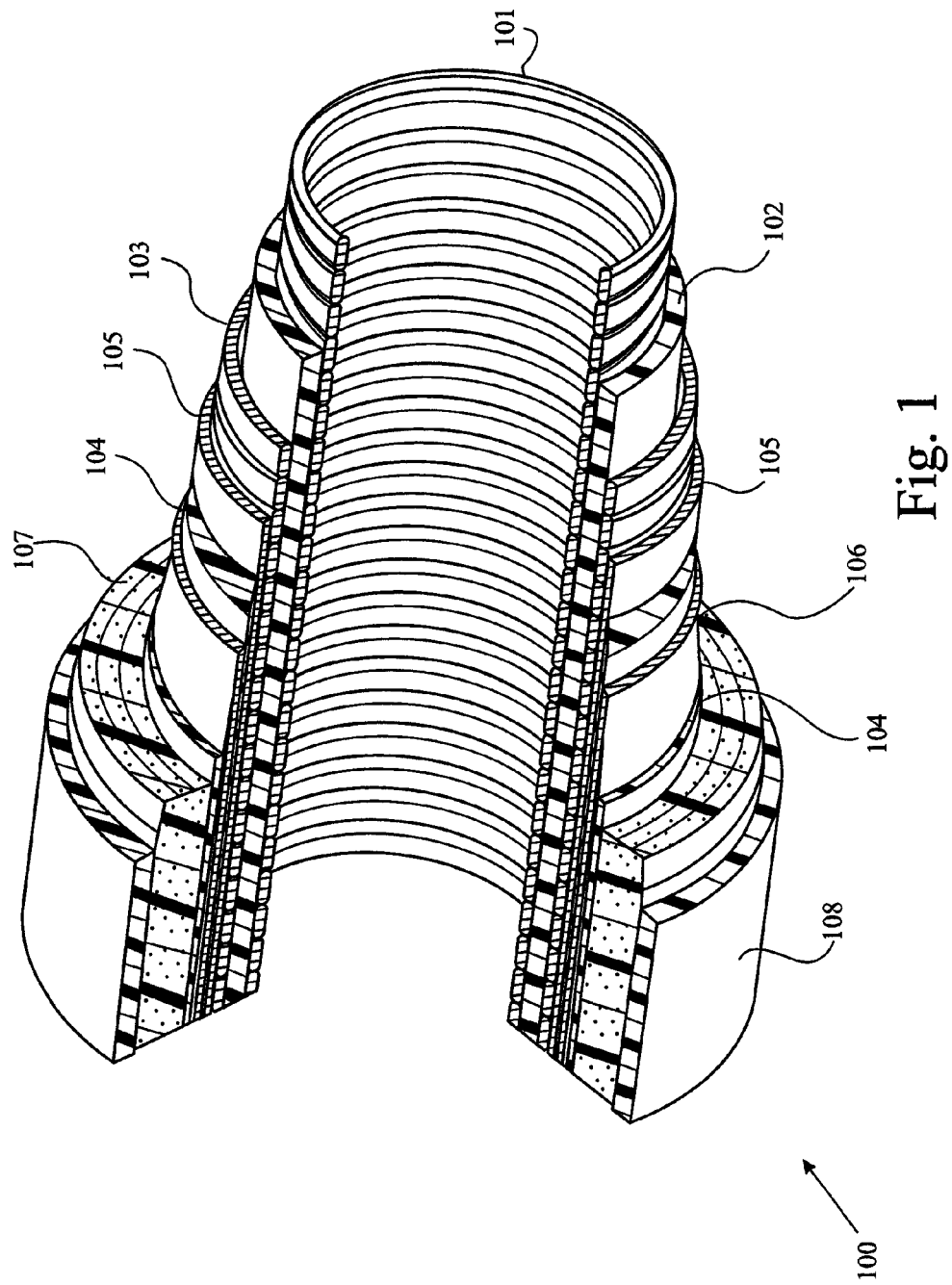
FIG. 1 illustrates a flexible pipe body.

Throughout this specification reference will be made to a flexible pipe. It will be understood that a flexible pipe is an assembly of a pipe body and one or more end fittings in each of which an end of the pipe body is terminated. FIG. 1 illustrates how a pipe body 100 is formed from a composite of layered materials that form a pressure-containing conduit. Although a number of particular layers are illustrated in FIG. 1, it is to be understood that the present invention is broadly applicable to composite pipe body structures including two or more layers.

As illustrated in FIG. 1, a pipe body typically includes an inner most carcass layer 101. The carcass provides an interlocked metallic construction that can be used as the innermost layer to prevent, totally or partially, collapse of an internal pressure sheath 102 due to pipe decompression, external pressure, tensile armour pressure and mechanical crushing loads.

The internal pressure sheath 102 typically comprises a polymer layer that ensures internal-fluid integrity. It is to be understood that this barrier layer may itself comprise a number of sub-layers.

A pressure armour layer 103 is a structural layer with a lay angle close to 90° that increases the resistance of the flexible pipe to internal and external pressure and mechanical crushing loads. The layer also structurally supports the internal-pressure sheath and typically consists of an interlocked metallic construction.

The flexible pipe body may also include one or more layers of tape 104 and a first tensile armour layer 105 and second tensile armour layer 106. Each tensile armour layer is a structural layer with a lay angle typically between 20° and 55°. Each layer is used to sustain tensile loads and internal pressure. The tensile armour layers are typically counter-wound in pairs.

The flexible pipe body also typically includes layers of insulation 107 and an outer sheath 108 which comprises a polymer layer used to protect the pipe against penetration of seawater and other external environments, corrosion, abrasion and mechanical damage. Each flexible pipe comprises a segment of pipe body 100 together with an end fitting located at least one end of the flexible pipe. An end fitting provides a mechanical device which forms the transition between the flexible pipe body and a connector. The different pipe layers as shown, for example, in FIG. 1 are terminated in the end fitting in such a way as to transfer the load between the flexible pipe and the connector.

Figure 2:
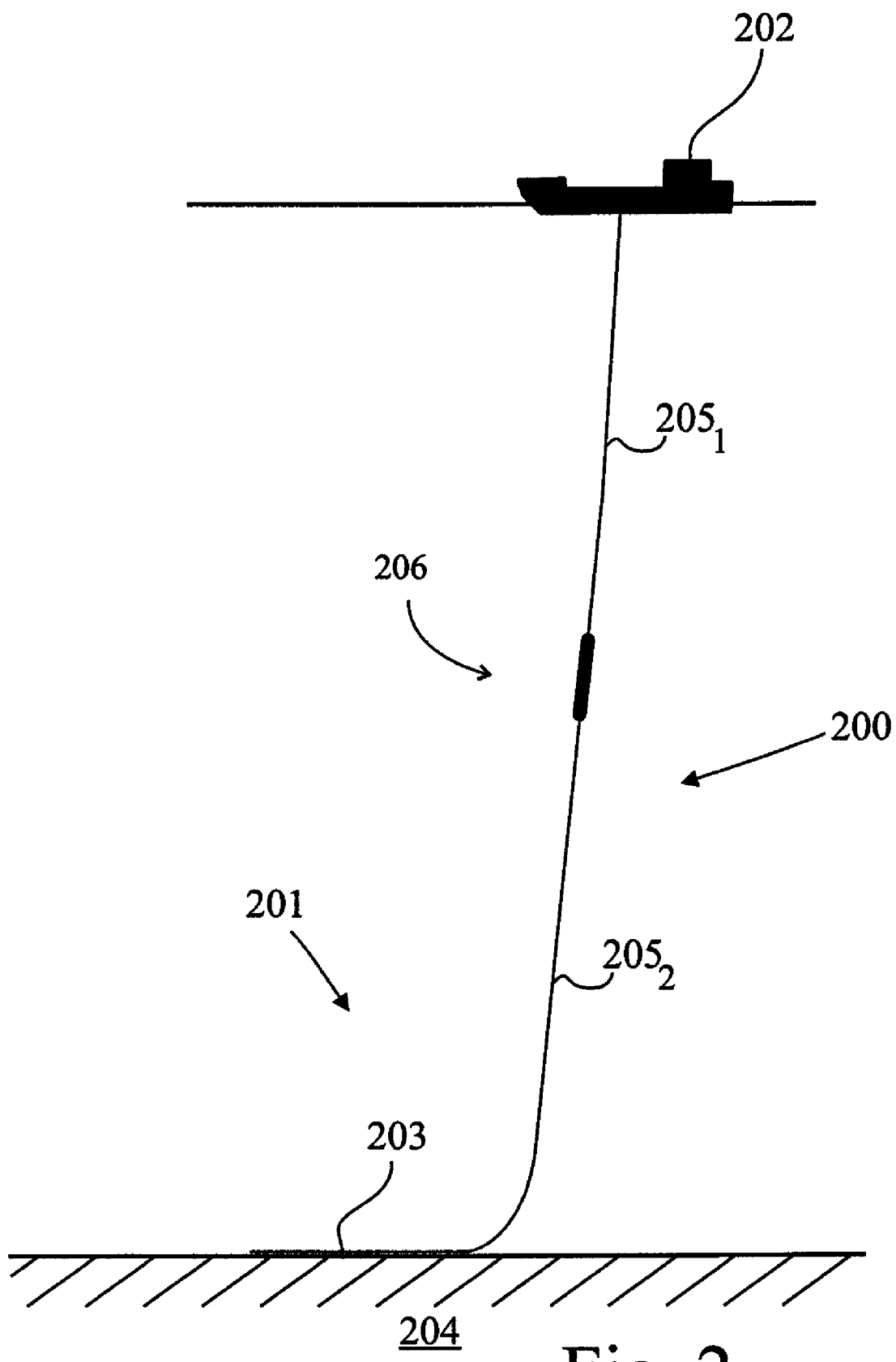
FIG. 2 illustrates a riser assembly.

FIG. 2 illustrates a riser assembly 200 suitable for transporting production fluid such as oil and/or gas and/or water from a sub-sea location 201 to a floating facility 202. For example, in FIG. 2 the sub-sea location 201 is a sub-sea flow line. The flexible flow line 203 comprises a flexible pipe, wholly or in part, resting on the sea floor 204 or buried below the sea floor and used in a static application. The floating facility may be provided by a platform and/or buoy or, as illustrated in FIG. 2, a ship. The riser 200 is provided as a flexible riser, that is to say a flexible pipe connecting the ship to the sea floor installation. The flexible pipe includes two segments of flexible pipe body 205, to 2052 and one junction 206 between adjacent segments of pipe body.

It will be appreciated that there are different types of riser, as is well-known by those skilled in the art. Embodiments of the present invention may be used with any type of riser, such as a freely suspended (free, catenary riser), a riser restrained to some extent (buoys, chains), totally restrained riser or enclosed in a tube (I or J tubes). Also it will be appreciated that embodiments of the present invention can be used for single segment risers having, for example, a single long length of pipe body terminated at one or both ends with an end fitting or to multi segment risers having more than one segment.

It will also be appreciated that whilst embodiments of the present invention may be applied to the provision of risers, embodiments are generally applicable to any instance when an end fitting must be used to terminate an end of a portion of flexible pipe body.

Figure 3:
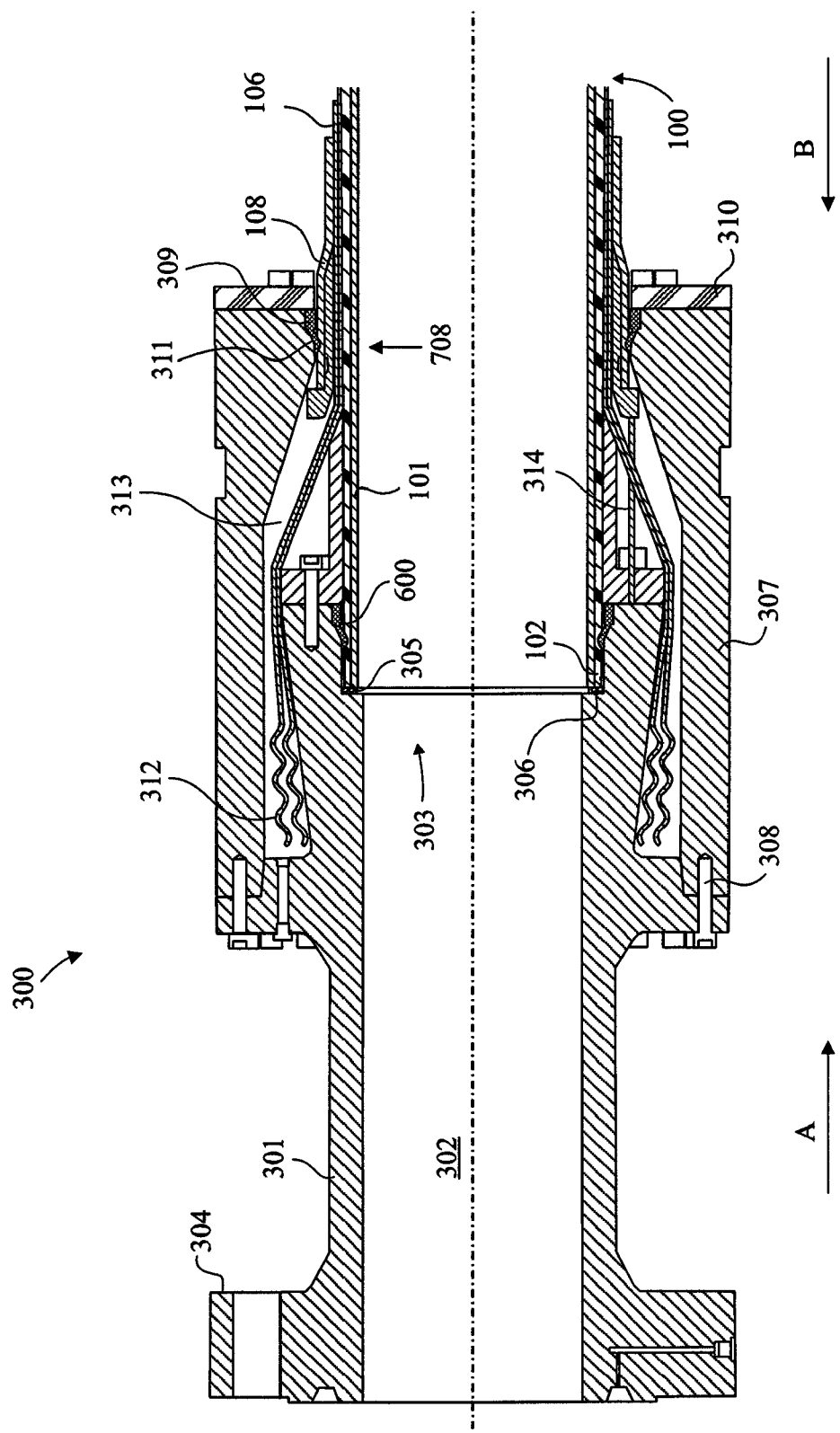
FIG. 3 illustrates an end fitting of a flexible pipe.

FIG. 3 illustrates an end fitting 300 for a flexible pipe. The end fitting 300 includes an end fitting body 301 which includes an internal bore 302 running along its length. The end fitting body is made from steel or some other such rigid material. At a first end of the end fitting body 301 the body defines an open mouth region 303 into which an end of a segment of flexible pipe body 100 is located and then terminated. At a further end of the end fitting body 301 is a connector 304. This is formed as a substantially disk-like flared region of the end fitting body. The connector can be connected directly to a matching connector of a further end fitting body of an adjacent segment of flexible pipe. This can be done using bolts or some other form of securing mechanism. In such a configuration the end fittings would be located in a back-to-back arrangement. Alternatively the connector 304 may be connected to a floating or stationary structure such as part of a ship, platform or other structure to which the flexible pipe is to be secured.

FIG. 4 illustrates the end fitting body 301 in more detail. The open mouth region 303 is formed by the open rim 400 of the end fitting body. This rim defines a circular open mouth through which a flexible pipe body may be introduced. The inner surface 401 includes a first stepped region 402 provided to receive a barrier layer sealing ring when a flexible pipe body is located in the end fitting and a further stepped region 403 arranged to receive a further sealing ring for sealing ends of layers of the flexible pipe body. The remainder of the inner surface 401 defines a substantially smooth inner bore along which transportation fluid will flow in use.

The end fitting body 301 includes a fastening region 404 extending outwardly from the waist of the body to which further parts of the end fitting may be secured during process of terminating the of flexible pipe body in the end fitting.

FIG. 4B illustrates an end elevation of the end fitting body in the third angle projection.

Returning to FIG. 3, the inner carcass 101 and barrier layer 102 are terminated by being cut at a particular location to provide an end 305 to the flexible pipe body. The sealing ring 306 is located at the end of the stepped region 403 of the end fitting body so as to help seal the ends of the carcass layer and barrier layer.

Figure 5B:
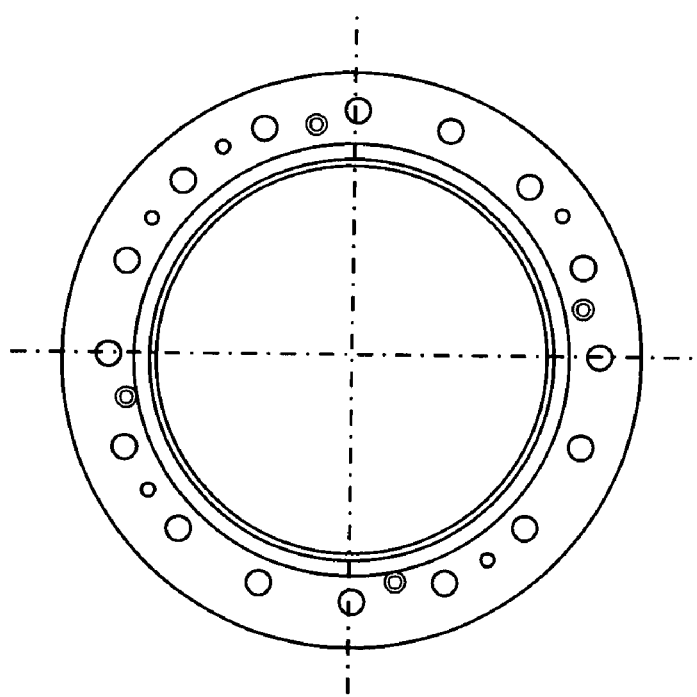
FIG. 5 illustrates an inner collar member.
Figure 5A:
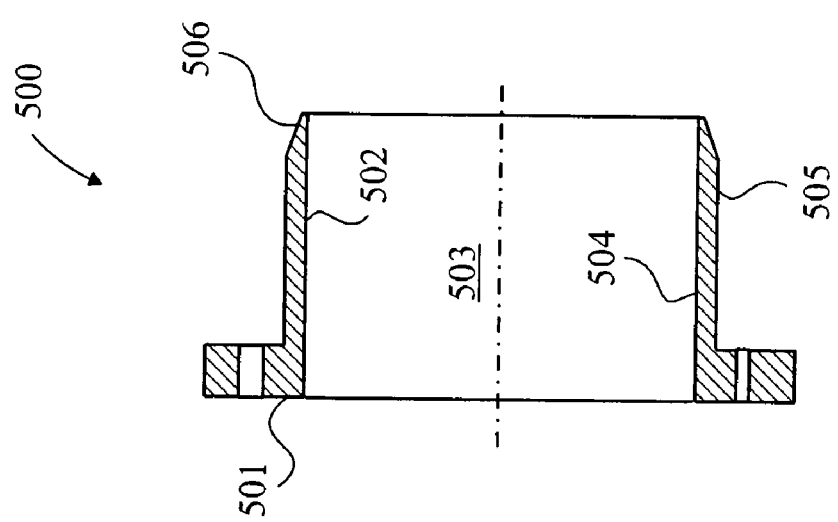

An inner collar 500 is illustrated more clearly in FIG. 5. The inner collar 500 is formed from a collar body 501 from which extends a neck 502. The inner collar 500 has a central bore 503 having a cross section defined by an inner surface 504 of the inner collar. The collar body 501 and neck 502 are integrally formed although these parts may be separately made. At an end of the neck 502 an outer surface 505 is formed in a curved surface 506. This curved surface has a radius of curvature selected to define a minimum radius of curvature of an inner tensile armour layer supported by the surface. This will be described hereinafter in more detail. FIG. 5B illustrates an end view of the inner collar from the right hand side in FIG. 5 (third angle projection). The inner collar 500 is an integral piece which helps improve efficiency during a mounting/assembly process. It will be understood that the inner collar could be formed as several pieces according to embodiments of the present invention.

Figure 6A:
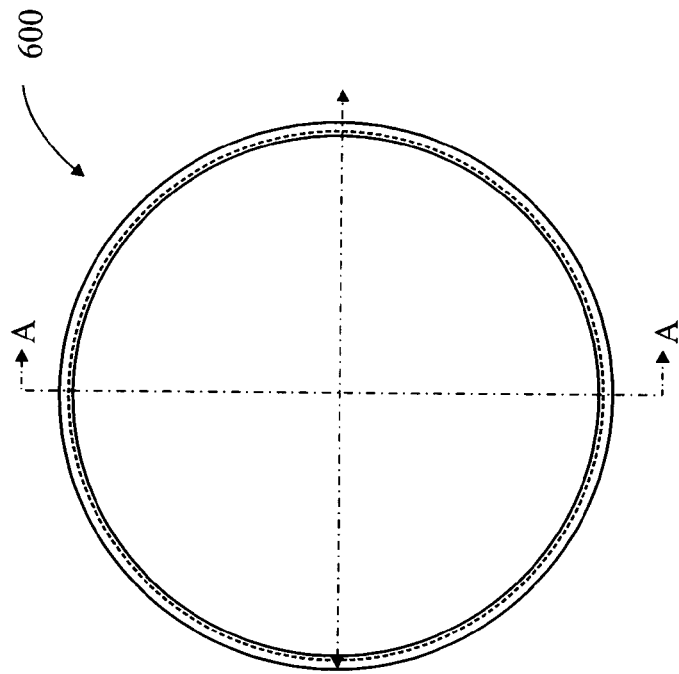
FIG. 6 illustrates a sealing ring.
Figure 6B:
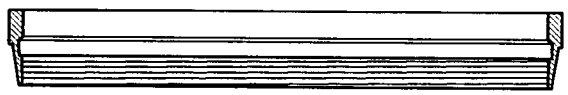
Figure 6C:
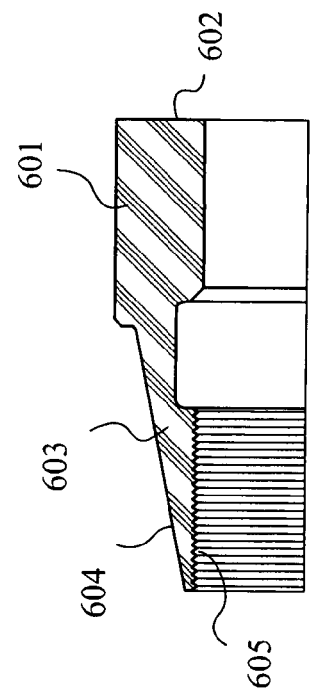

FIG. 6 illustrates sealing ring 600 which may be used to form a seal between an outer surface of the barrier layer 102 of the flexible pipe body and the end fitting body 301. The ring may be a composite structure including metallic and elastomeric parts typically silicone based. The sealing ring 600 is a substantially annular ring shaped piece having a substantially rectangular body 601 which includes an abutment face 602. As illustrated in FIG. 3, the abutment face 602 will abut with a portion of the rim formed by the body of the inner collar member. The sealing ring 600 also includes a wedge-like section 603 which has a smooth outer surface 604 arranged to engage with an inner engagement surface of the end fitting body. Part 605 of the inner surface of the wedge-like part of the sealing ring includes small projections. These projections help furnish a good seal by partially digging into the barrier layer outer surface. However, the projections are so small that micro-cracking of the material of the barrier layer is avoided when the sealing ring is driven into sealing engagement with the barrier layer. As the end fitting body 301 is drawn towards the inner collar member 500, as will be described in more detail hereinafter, an engagement surface of the end fitting body engages with the surface 604 of the sealing ring. This tends to urge the sealing ring in a direction from left to right in FIG. 3 until the abutment surface 602 meets with the surface of the inner collar body. Further movement to the right is then prevented. Further movement of the end fitting body 301 from left to right deforms the wedge-like portion of the sealing ring so as to urge the projections 605 into a close sealing configuration with the barrier layer 102 of the terminated flexible pipe body.

Figure 7:
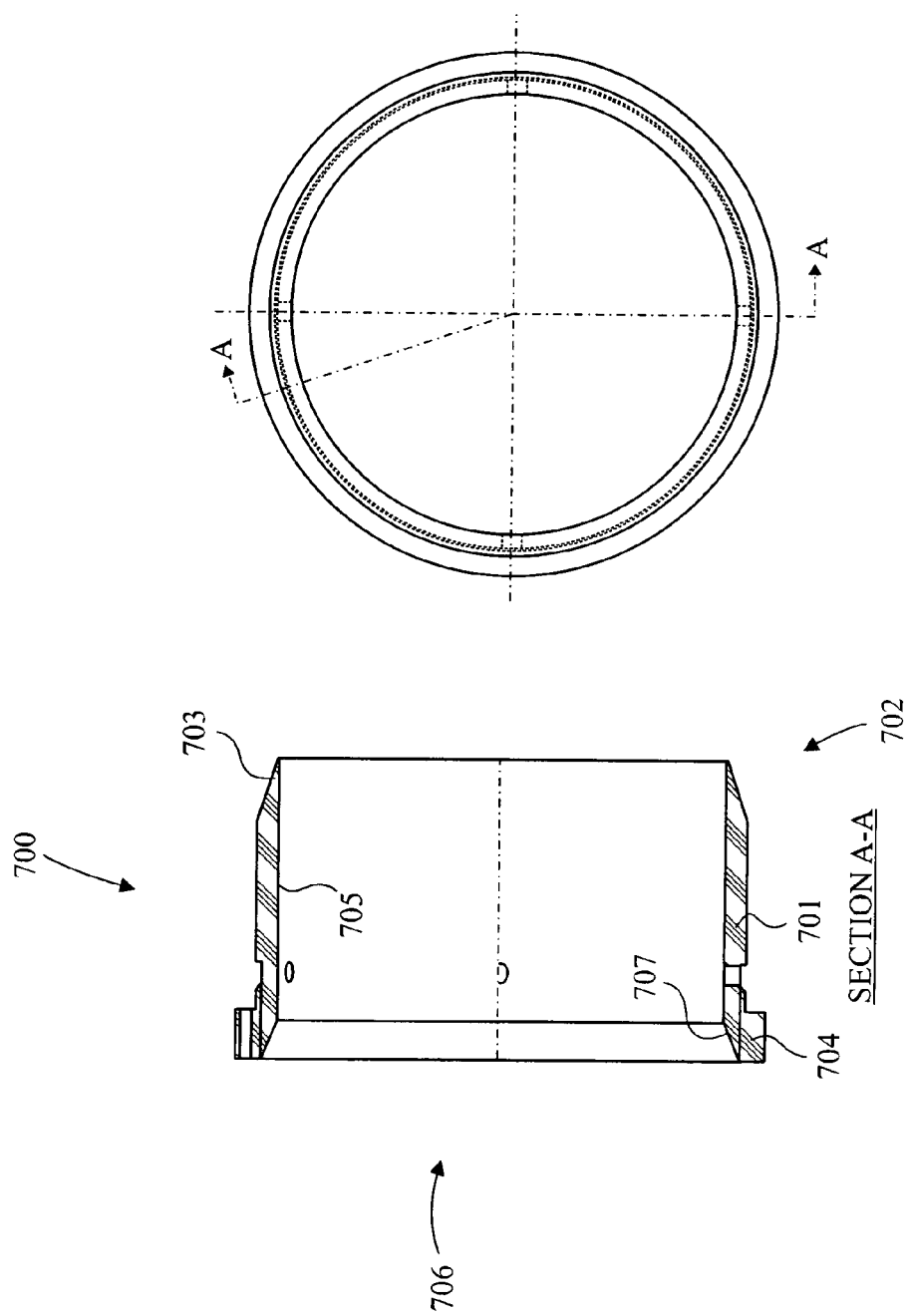
FIG. 7 illustrates an outer collar member.

FIG. 7 illustrates an outer collar 700. The outer collar 700 includes a substantially cylindrical neck region 701 which is tapered at a first end region 702 thereof. The tapered end 703 helps when the outer collar is slotted between selected layers of the flexible pipe body. Having a taper thus helps when the outer collar is driven between selected layers. In FIG. 3 the outer collar is shown slotted between an outer sheath and an outer tensile armour layer 106. It is to be understood that the flexible pipe body 100 illustrated in FIG. 3 does not show all of the layers illustrated in FIG. 1 for the sake of brevity. The outer collar 700 is an integral piece which helps improve efficiency during a mounting/assembly process. It will be understood that the outer collar member could be formed as several pieces according to embodiments of the present invention.

The outer collar 700 also includes a body portion 704 from which the neck extends. The body is turned outwardly with respect to the neck. An inner surface 705 of the neck 701 is generally cylindrical but towards an open mouth 706 the inner surface flares outwardly. This inner surface region 707 may be gently curved and advantageously will have a radius of curvature common to the radius of curvature of the curved outer surface 506 of the inner collar member. In this way when the tensile armour layers 106 of the flexible pipe body are bent away from the barrier layer at a selected location 708, the outermost tensile armour layer may be bent against the curved surface 707. The curved surface 707 thus determines a minimum radius of curvature of the tensile armour layer. A remainder length of the tensile armour layers is located in a cavity in the end fitting in which the wire will be terminated. This cavity is filled with epoxy as described hereinafter in order to lock the wires in position.

Referring again to FIG. 3, the end fitting 300 further includes a casing 307 which is secured via one or more bolts 308 or other such securing mechanism to the end fitting body. The casing acts as a housing and is sealed to the outer sheath 108 of the flexible pipe body via an outer sealing ring 309 of the type illustrated in FIG. 6. The outer casing 307 is first attached to the end fitting and then an end plate 310 is secured to the casing. As the end plate 310 is driven towards the housing to secure the plate to the housing, the plate drives the seal 309 in a direction right to left as shown in FIG. 3. The outer surface of the wedge-like part of the seal thus engages with a surface 311 of the casing which produces an inwards force urging the wedge-like portion of the seal ring into a sealing arrangement with an outer surface of the outer sheath 108.

Ends 312 of the tensile armour layers 106 are terminated within a cavity 313 formed between an inner surface of the housing 307 and the end fitting body 301 and inner collar 500. This cavity 313 can be filled with epoxy or some other flowable sealant so that the end structure is substantially solid. This also helps lock component parts of the end fitting in place to prevent component movement.

Figure 8:
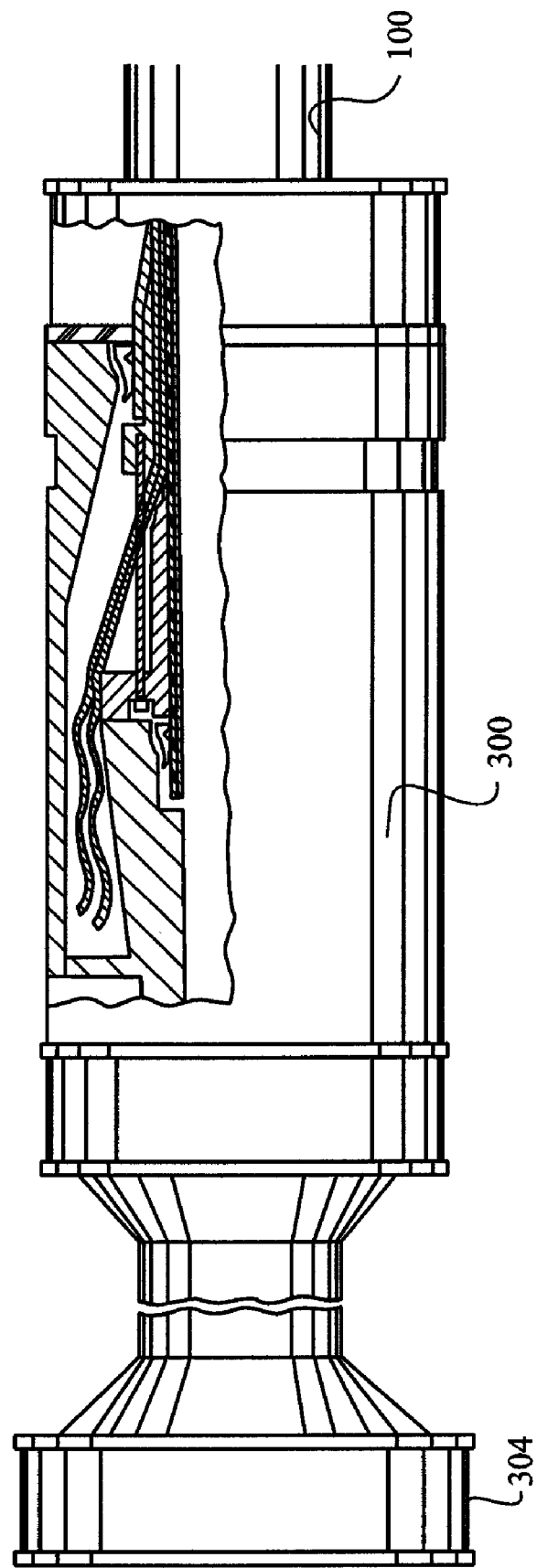
FIG. 8 illustrates an end fitting cut away.

FIG. 8 illustrates the end fitting 300 shown in FIG. 3 in cut-away form. As illustrated in FIG. 8, an end part of a segment of flexible pipe body 100 is input into one end of the end fitting 300. At a remainder end of the end fitting 300 the connector 304 provides a rigid structure which may be bolted or otherwise secured to a corresponding connector of an adjacent end fitting or to some other structure to which the flowline formed by the flexible pipe is to be secured. The end of the flexible pipe 100 is terminated within the end fitting with the various layers of the multi-layer flexible pipe being terminated at specific points along the length of the end fitting. A number of seals are provided so as to prevent leakage of transportation fluid flowing along the pipe and end fitting bore.

A method for terminating a segment of flexible pipe body according to an embodiment of the present invention will now be described. The flexible pipe body 100 is to be terminated in an end fitting 300. For this reason the end of the flexible pipe body is cut across at a desired length. Next various parts of the end fitting are threaded over the, at this stage, open end of the pipe. These parts include the, Jacket 307, end plate (outer collar) 310, and outer seal ring 311.

Next the various layers making up the multi-layer flexible pipe are cut to selected lengths. For example, the outer sheath 108 is cut much shorter than the carcass 101 and barrier layer 102 whilst the tensile armour layers are cut even longer. Next the outer collar 700 is slotted into position at the open end of the flexible pipe body. For example, the neck of the outer collar may be slotted between the outer sheath and outermost tensile armour layer. Once slotted in position the outer collar is kept in place by pressure between the layers of the flexible pipe body. These squeeze the neck of the outer collar effectively locking it in place. The armour wires 312 are then bent outwardly away from their supporting role next to the barrier layer of the flexible pipe body. The bend occurs at a selected region 708. As shown in FIG. 3, this region corresponds to the location of the curved surface formed on the inner surface of the body part of the outer collar. By bending the armour layers against this curved surface, a minimum radius of curvature of the wires is controlled so that over-bending does not occur.

Some preparation of the various sealing faces such as measurement of the surfaces and sanding down may then occur followed by a process of securing the inner collar 500 in a relative position to the outer collar 700. This is may be achieved using long bolts 314 or some other such securing means. Part 500 can be manufactured from a single ring or a split ring (and bolted together) and may be secured in place using friction or other attachment mechanism such as bonding with epoxy resin adhesive or being bolted to the outer collar, typically using long bolts 314. Once the armour layers have been bent away from being parallel to the barrier layer and the inner collar has been secured in place, a seal ring 600 is placed around the open end of the pipe. The end fitting body 301 is then moved towards the end of the body of the inner collar 500. The action of drawing the end fitting body on to the pipe swages the inner seal ring 600 down on to the fluid barrier.

In this embodiment the inner collar is secured in place with sufficient force to minimise movement when the swaging process is undertaken. This has the advantage of controlling the location at which the seal ring is secured and thereby the relative position of all the other components. Positioning the body 301 in place then drawing the seal ring on to the body, through the action of an unsecured inner collar moving in direction B as the bolts 313 are tightened is not as advantageous. This is because the point at which the seal ring is secured is fixed relative to the other components: the location of the inner collar, relative to the other components, is not fixed prior to the swaging process. Furthermore though the inner seal ring is initially swaged in direction B, once it bites into the underlying polymer layer the inner seal ring remains fixed and the body 301 moves in direction A potentially crushing the insulator ring 305.

The end fitting body 301 is then moved towards the end of the body of the inner collar 500. As the end fitting is moved towards the flexible pipe, the flexible pipe may be held in a rigid position by the inner and outer collar. As the end fitting body is moved in a direction illustrated by arrow A in FIG. 3, an engagement surface formed as part of the shoulder 402 urges the sealing ring into an abutting relationship with the inner collar. Further movement from left to right, as shown in FIG. 3, causes the shoulder of the end fitting to urge the wedge-like portion of the seal ring inwards into a close sealing relationship with an outer layer of the barrier layer of the flexible pipe body. This energises the seal. The end fitting body 301 may then be bolted to the inner collar using bolts or some other securing mechanism. The free ends 312 of the armour wires are then bent into a position within the cavity 313 which is partially defined at this stage. Such a position is illustrated generally in FIG. 3. The armour wires may be supported on an outer rim surface of the body of the inner collar and an outer surface of the end fitting body. The wires may be secured in place using straps. The outer jacket 307 is then secured, using bolts 308, to the waist of the end fitting body 301. This forms the cavity 313.

The outer seal ring 309 previously hooped on the flexible pipe body is now brought into position by sliding it in a direction illustrated by arrow B in FIG. 3, into the space formed between an inner surface of the jacket 307 and the outer sheath 108 of the flexible pipe body. The end ring 310 is then bolted to the jacket. As the ring is secured it is urged in a direction illustrated as direction B in FIG. 3 towards the jacket. This urges the sealing ring 309 towards abutment surfaces on the jacket which activates the seal.

At this stage the end fitting is hung in a vertical direction. Epoxy or some other flowable sealant is then injected through injection ports (not shown) to fill the cavity 313 in the end fitting. This locks the wires further in place and helps improve overall mechanical integrity.

In conventional end fittings of flexible pipe the complete weight of the end fitting, prior to the filling of the cavity 313 with a material that secures the armour wires in place, is being borne by the anchoring of the seal ring 600 in to the underlying fluid barrier. This direct loading of the seal ring has the effect of increasing the probability that the end fitting process would induce movement at the seal ring and thereby impair its functionality. Where the inner collar is secured on the pipe the load would be shared between the action of the inner collar and the seal ring thereby reducing the risk associated with manipulating the end fitting prior to the filling of the cavity.

In one embodiment of the invention the inner collar 500 is secured by some mechanism (typically through the use of a long bolts 314) with sufficient force and proximity to the outer collar 700 such that the armour wire layers are clamped between the curved surface of the outer collar and the curved surface of the inner collar. This locks the wires in place. It will be appreciated that rather than each of the outer collar and inner collar being provided with a curved surface, only one of the collars may need such a support surface. Furthermore, it will be appreciated that the curve of the surface may be linear.

Figure 9:
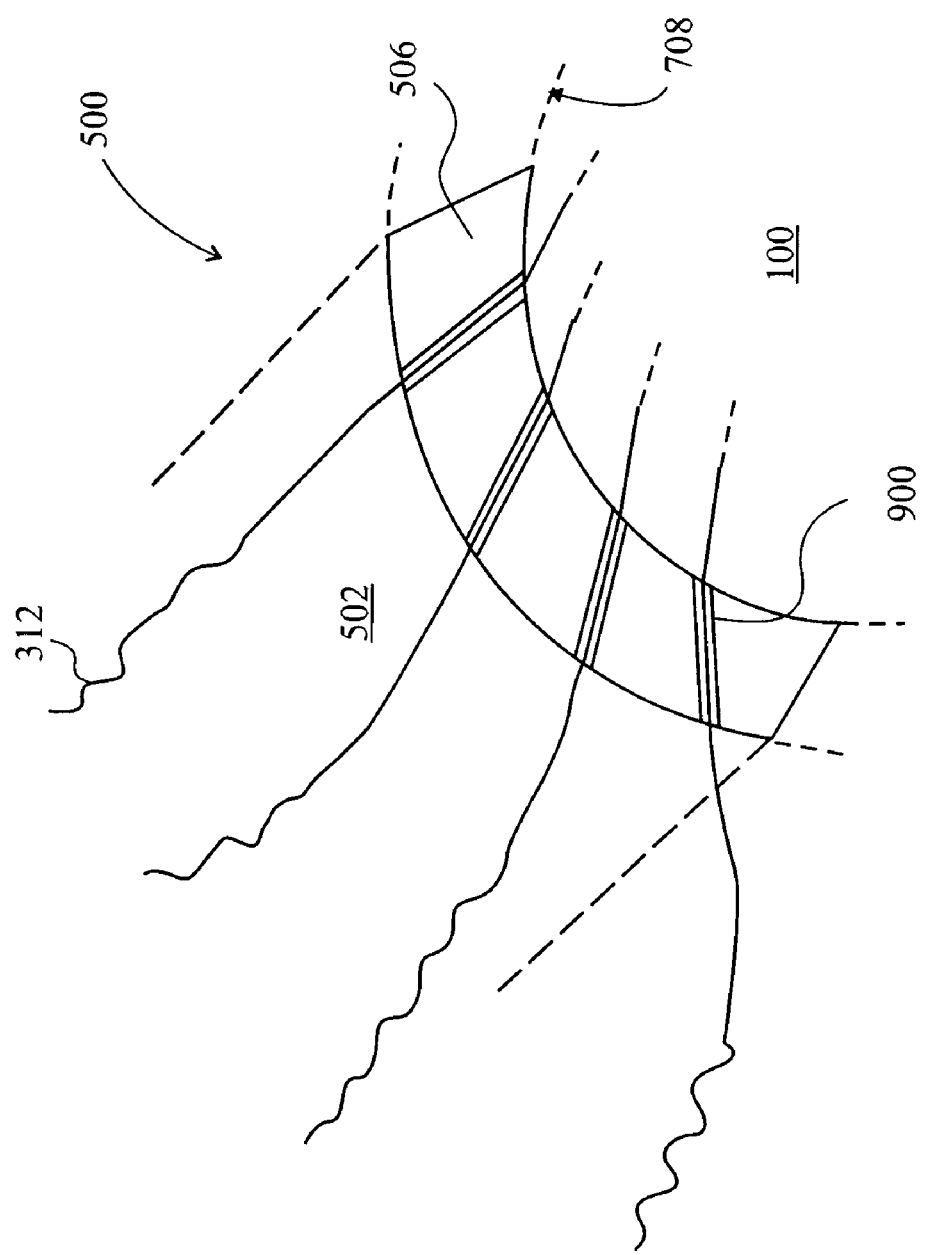
FIG. 9 illustrates guide grooves for armour wires.
  In the drawings like reference numerals refer to like parts.

According to embodiments of the present invention, one or more of the support surfaces of the inner collar and/or outer collar may include grooves. FIG. 9 illustrates the curved surface 506 and neck 502 of the inner collar 500 in more detail in accordance with an embodiment of the present invention. It is to be understood that only a section of the inner collar 500 is shown in FIG. 9 for the sake of convenience. The collar can be an integral cylindrical structure or may be made in sections. Wires forming part of the inner tensile armour layer 106 are wound at a high lay angle with respect to the pipe body 100. As each of these is bent away from the underlying barrier layer at around the bend region 708, each wire is located in a respective guide slot 900. The guide slot is preferably deep enough to encompass the whole diameter of the wire although it will be appreciated that the guide slots may be provided having less depth. Advantageously the guide slots 900 may have a depth of half a wire diameter with a further mating slot being provided on the curved surface 707 of the outer collar.

It will be appreciated that whilst the first armour layer is laid at a first angle with respect to the flexible pipe body, a further tensile armour layer is wound in a different direction. In such circumstances further guide slots (not shown) may be formed in the curved surface 506 of the inner collar at an angle to match the run off angle of those further wires. By providing grooved slots in at least one of the curved surfaces of the inner collar and/or outer collar the curved surfaces of the inner and outer collar can be brought into close juxtaposed relationship. This helps ensure that the neck 502 of the inner collar extends a maximum possible distance so as to support the barrier layer of the flexible pipe as much as possible. Effectively the neck 502 and outer collar neck and outer collar body will support the barrier layer between the end fitting body and a region of the flexible pipe body which retains its integrity. This also helps lock the wires in position to prevent movement which might otherwise damage the epoxy or other features of the end fitting.

Embodiments of the present invention thus provide an end fitting of a flexible pipe. The end fitting has an end fitting body having an open mouth which receives an end of a segment of flexible pipe body which is to be terminated in the end fitting. An inner collar is secured to the flexible pipe and this inner collar includes an elongate neck which has an inner surface which defines a substantially cylindrical bore. The diameter of this bore is selected to closely match the diameter of an outer surface of a barrier layer of the flexible pipe body. When the flexible pipe body is threaded through this central bore, the inner surface of the neck (and indeed a portion of the body) of the inner collar supports the barrier layer of the flexible pipe body. This helps prevent burst through of the material of the barrier layer caused by pressure of the transported fluid pushing through the barrier layer material at unsupported locations.

Embodiments of the present invention provide an inner collar which includes an end region having a curved outer surface. The curve of the outer surface is selected so as to determine a radius of curvature of wires of an armour layer of the flexible pipe when those wires are bent away from an axis of the flexible pipe during termination in an end fitting. Embodiments of the present invention also provide an outer collar member having a similar curved surface located on an inner surface region.

Embodiments of the present invention provide a method for securing wires of one or more armour layers of a flexible pipe when an end of flexible pipe body is terminated in an end fitting. The method includes bending the wires away from an axis of a flexible pipe and locating each wire individually (although more than one wire may be duly located) in a common groove. Contact surfaces of an inner collar and outer collar may be urged together to thereby lock the wires of the armour layer in position at predetermined locations. This helps prevent crumbling of epoxy used to fill the cavity which might otherwise occur when wires are not so locked in place due to a scissor-like action of the armour wires.

Embodiments of the present invention provide a method for securing an end fitting to a flexible pipe body. The method involves securing some rigid structure, for example, in the form of an inner and outer collar to an end of flexible pipe body. The end fitting is then secured to that structure, such as to an inner collar. By drawing the end fitting body towards the flexible pipe rather than drawing the flexible pipe body towards an end fitting, a more advantageous method of assembly can be provided.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A flexible pipe for transporting production fluids such as oil, gas and water from a sub-sea location comprising an end fitting and a flexible pipe body, comprising:
    an end fitting body having an open mouth region for receiving an open end of a portion of flexible pipe body; and
    an inner collar member to which said end fitting body is securable, said inner collar member comprising a collar body portion and a neck portion extending away from said collar body portion; and
    an outer member, wherein
    when said end fitting body is secured to said inner collar member, the neck portion of the inner collar member extends in an axial direction away from the end fitting body to a region proximate to where at least one armour wire layer of the flexible pipe body is located, and wherein
    the flexible pipe further comprises securing means by which the outer collar member is secured directly to the inner collar member such that the at least one armour wire is clamped between the outer collar member and the inner collar member, thereby locking the at least one armour wire directly between a surface of the outer collar member and a surface of the inner collar member such that the surface of the outer collar member and the surface of the inner collar member contact the at least one armour wire.

2. The flexible pipe as claimed in claim 1, further comprising:
    an inner surface of said inner collar member extends substantially parallel with a barrier layer of said flexible pipe body located in said end fitting, and is arranged for supporting one or more underlying layer between said end fitting body and said region.

3. The flexible pipe as claimed in claim 1, further comprising:
    an end portion of said neck portion of said inner collar member is locatable under a bent section of the at least one armour wire layer of said flexible pipe body where said wire layer is bent away from a barrier layer of the flexible pipe body.

4. The flexible pipe as claimed in claim 1, further comprising:
    securing means for securing said end fitting body to said inner collar member.

5. The flexible pipe as claimed in claim 1, further comprising:
    said inner collar member further comprises a drive surface on the collar body portion, said drive surface of said inner collar member being arranged to drive a sealing ring located in a recess between an inner surface of the end fitting body and an outer surface of a barrier layer of said flexible pipe body, into a sealed configuration as said end fitting is secured to said inner collar member.

6. The flexible pipe as claimed in claim 1 wherein:
    the collar body portion of said inner collar member further comprises an outer surface for supporting wires from the at least one armour wire layer within a cavity of said end fitting.

7. A riser assembly comprising the flexible pipe as claimed in claim 1.

8. A method of providing an end fitting at an end of a portion of flexible pipe body for transporting production fluids such as oil, gas and water from a sub-sea location, comprising the steps of:
    providing an inner collar member comprising a collar body portion and a neck portion extending away from the collar body portion;
    providing an outer collar member;
    securing an end fitting body of the end fitting to the inner collar member whereby the neck portion of the inner collar member extends in an axial direction away from the end fitting body to a region proximate to where at least one armour wire layer of the flexible pipe body is located; and
    securing the outer collar member directly to the inner collar member such that the at least one amour wire layer is clamped between the outer collar member and the inner collar member, thereby locking the at least one armour wire directly between a surface of the outer collar member and a surface of the inner collar member such that the surface of the outer collar member and the surface of the inner collar member contact the at least one armour wire.

9. The method as claimed in claim 8, further comprising the steps of:
    supporting a barrier layer of said flexible pipe body between said end fitting and said region with an inner surface of the inner collar member.

10. The method as claimed in claim 8, further comprising the steps of:
  locating an end portion of said neck portion of the inner collar member under a bent section of the at least one armour wire layer of the flexible pipe body where said wire layer is bent away from a barrier layer of the flexible pipe body.

11. The method as claimed in claim 8, further comprising the steps of:
  driving a sealing ring into a sealed configuration simultaneously with said step of securing the end fitting body to the inner collar member.

12. A method of assembling a riser assembly comprising the steps of claim 8.

13. The flexible pipe as claimed in claim 1, wherein the securing means comprises a bolt extending in the axial direction from the outer collar member to the inner collar member.

14. The method as claimed in claim 8, wherein securing the outer collar member directly to the inner collar member comprises securing the outer collar member to the inner collar member with a bolt extending in the axial direction from the outer collar member to the inner collar member.

* * * * *